United States Patent
Raghavan et al.

(10) Patent No.: US 11,895,572 B2
(45) Date of Patent: Feb. 6, 2024

(54) AMPLITUDE CONTROL CAPABILITY SIGNALING

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 17/454,458

(22) Filed: Nov. 10, 2021

(65) Prior Publication Data

US 2023/0146595 A1     May 11, 2023

(51) Int. Cl.
*H04W 48/04* (2009.01)
*H04B 17/10* (2015.01)
*H04W 8/22* (2009.01)
*H04W 48/16* (2009.01)
*H04L 1/00* (2006.01)

(52) U.S. Cl.
CPC .......... *H04W 48/04* (2013.01); *H04B 17/102* (2015.01); *H04W 8/22* (2013.01); *H04W 48/16* (2013.01); *H04L 1/0003* (2013.01)

(58) Field of Classification Search
CPC ..... H04W 48/04; H04W 48/12; H04W 48/16; H04W 8/22; H04W 8/24; H04W 8/245; H04B 17/101; H04B 17/102; H04B 17/104; H04B 17/12; H04L 1/0003
See application file for complete search history.

(56) References Cited

U.S. PATENT DOCUMENTS

| | | | |
|---|---|---|---|
| 11,750,267 B1 * | 9/2023 | Raghavan ............ | H04B 7/0857 375/347 |
| 2009/0131027 A1 * | 5/2009 | Breuer ................ | H04W 52/50 455/418 |
| 2009/0303955 A1 * | 12/2009 | Teo ....................... | H04B 7/061 370/344 |
| 2019/0081753 A1 * | 3/2019 | Jung ..................... | H04B 7/088 |
| 2020/0319324 A1 * | 10/2020 | Au ...................... | H04W 48/16 |
| 2021/0105724 A1 | 4/2021 | Huang | |
| 2021/0194551 A1 | 6/2021 | Raghavan et al. | |
| 2022/0029679 A1 | 1/2022 | Pezeshki | |
| 2023/0028143 A1 * | 1/2023 | Raghavan ............ | H04B 7/0617 |

(Continued)

OTHER PUBLICATIONS

CATT: "Enhancements on Multi-Beam Operation", R1-2100343, 3GPP TSG RAN WG1 #104-e, 3rd Generation Partnership Project, Mobile Competence Centre, 650, Route Des Lucioles, F-06921, Sophia-Antipolis Cedex, France, vol. RAN WG1, No. e-Meeting, Jan. 25, 2021-Feb. 5, 2021, Jan. 19, 2021, XP051970946, 17 Pages, p. 11/17, Section 1 UE capability for latency.

(Continued)

*Primary Examiner* — Kevin D Mew
(74) *Attorney, Agent, or Firm* — QUALCOMM Incorporated

(57) ABSTRACT

Various aspects of the present disclosure generally relate to wireless communication. In some aspects, a user equipment (UE) may transmit, to a wireless device, information indicating an amplitude control capability of the UE. The UE may receive, from the wireless device, a communication using amplitude control. Numerous other aspects are described.

28 Claims, 10 Drawing Sheets

(56) References Cited

U.S. PATENT DOCUMENTS

2023/0254783 A1\* 8/2023 Raghavan ............. H04W 52/42
455/522
2023/0262745 A1\* 8/2023 Raghavan ........... H04W 72/046
370/329

OTHER PUBLICATIONS

International Search Report and Written Opinion—PCT/US2022/078420—ISA/EPO—dated Jan. 30, 2023.

\* cited by examiner

AMPLITUDE CONTROL CAPABILITY SIGNALING

FIELD OF THE DISCLOSURE

Aspects of the present disclosure generally relate to wireless communication and to techniques and apparatuses for amplitude control capability signaling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting, to a wireless device, information indicating an amplitude control capability of the UE, the information indicating the amplitude control capability indicating a period of time associated with the amplitude control. The method may include receiving, from the wireless device, a communication using amplitude control.

Some aspects described herein relate to a method of wireless communication performed by a wireless device. The method may include receiving, from a UE, information indicating an amplitude control capability of the UE, the information indicating the amplitude control capability indicating a period of time associated with the amplitude control. The method may include transmitting, to the UE, a communication using one or more transmit parameters that are based at least in part on the UE being capable of performing amplitude control.

Some aspects described herein relate to a UE for wireless communication. The user equipment may include a memory and one or more processors coupled to the memory. The one or more processors may be configured to transmit, to a wireless device, information indicating an amplitude control capability of the UE, the information indicating the amplitude control capability indicating a period of time associated with the amplitude control. The one or more processors may be configured to receive, from the wireless device, a communication using amplitude control.

Some aspects described herein relate to a wireless device for wireless communication. The wireless device may include a memory and one or more processors coupled to the memory. The one or more processors may be configured to receive, from a UE, information indicating an amplitude control capability of the UE, the information indicating the amplitude control capability indicating a period of time associated with the amplitude control. The one or more processors may be configured to transmit, to the UE, a communication using one or more transmit parameters that are based at least in part on the UE being capable of performing amplitude control.

Some aspects described herein relate to a non-transitory computer-readable medium that stores a set of instructions for wireless communication by a UE. The set of instructions, when executed by one or more processors of the UE, may cause the UE to transmit, to a wireless device, information indicating an amplitude control capability of the UE, the information indicating the amplitude control capability indicating a period of time associated with the amplitude control. The set of instructions, when executed by one or more processors of the UE, may cause the UE to receive, from the wireless device, a communication using amplitude control.

Some aspects described herein relate to a non-transitory computer-readable medium that stores a set of instructions for wireless communication by a wireless device. The set of instructions, when executed by one or more processors of the wireless device, may cause the wireless device to receive, from a UE, information indicating an amplitude control capability of the UE, the information indicating the amplitude control capability indicating a period of time associated with the amplitude control. The set of instructions, when executed by one or more processors of the wireless device, may cause the wireless device to transmit, to the UE, a communication using one or more transmit parameters that are based at least in part on the UE being capable of performing amplitude control.

Some aspects described herein relate to an apparatus for wireless communication. The apparatus may include means for transmitting, to a wireless device, information indicating an amplitude control capability of the apparatus, the information indicating the amplitude control capability indicating a period of time associated with the amplitude control. The apparatus may include means for receiving, from the wireless device, a communication using amplitude control.

Some aspects described herein relate to an apparatus for wireless communication. The apparatus may include means for receiving, from a UE, information indicating an amplitude control capability of the UE, the information indicating the amplitude control capability indicating a period of time associated with the amplitude control. The apparatus may include means for transmitting, to the UE, a communication using one or more transmit parameters that are based at least in part on the UE being capable of performing amplitude control.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
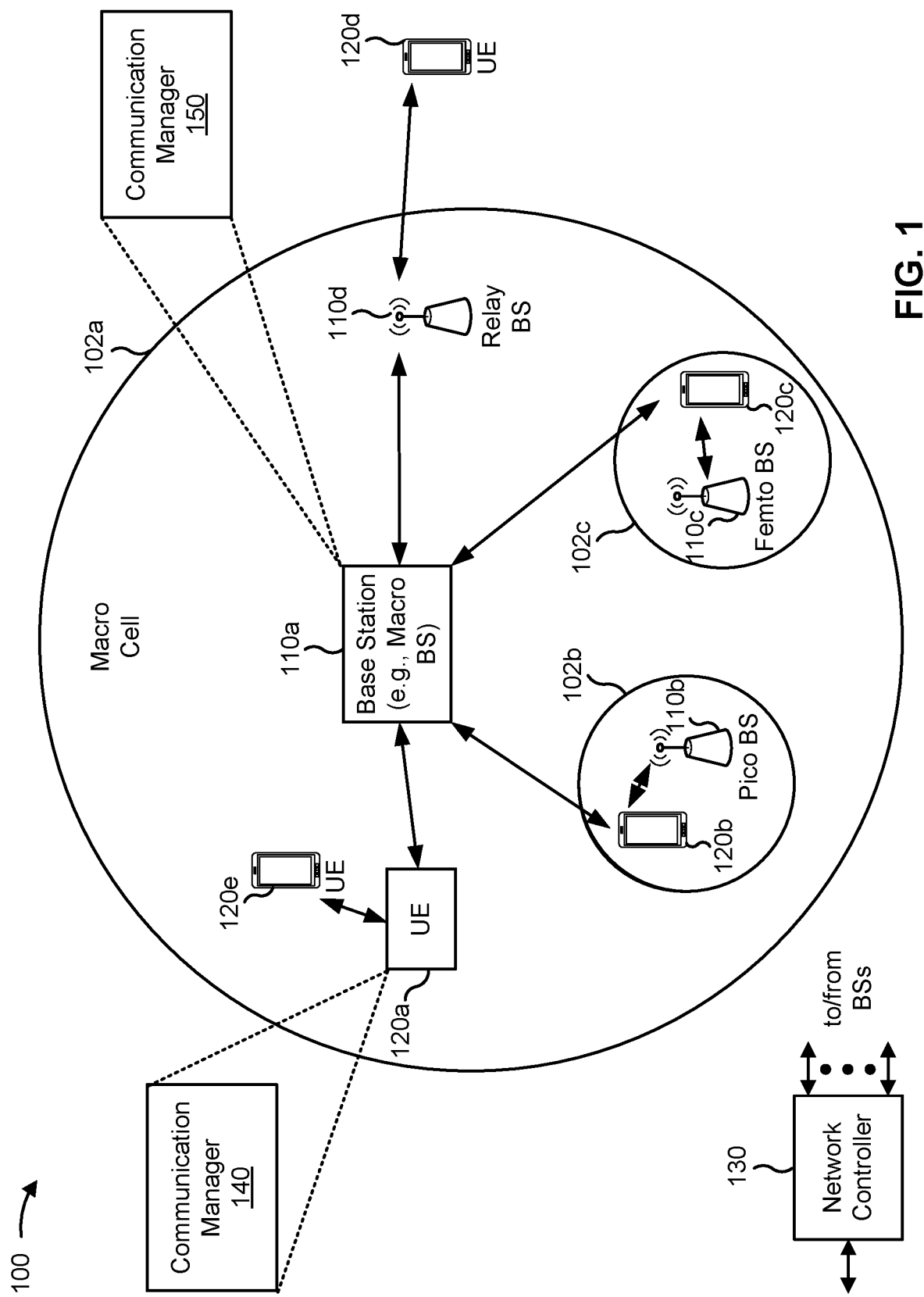
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a UE 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit, to a wireless device, information indicating an amplitude control capability of the UE, the information indicating the amplitude control capability indicating a period of time associated with the amplitude control; and receive, from the wireless device, a communication using amplitude control. In some aspects, as described in more detail elsewhere herein, the communication manager 140 may receive, from another UE, information indicating an amplitude control capability of the other UE, the information indicating the amplitude control capability indicating a period of time associated with the amplitude control; and transmit, to the other UE, a communication using one or more transmit parameters that are based at least in part on the other UE being capable of performing amplitude control. Additionally, or alternatively, the communication manager 140 may perform one or more other operations described herein.

In some aspects, the base station 110 may include a communication manager 150. As described in more detail elsewhere herein, the communication manager 150 may receive, from a UE, information indicating an amplitude control capability of the UE, the information indicating the amplitude control capability indicating a period of time associated with the amplitude control; and transmit, to the UE, a communication using one or more transmit parameters that are based at least in part on the UE being capable of performing amplitude control. Additionally, or alternatively, the communication manager 150 may perform one or more other operations described herein.

As indicated above, FIG. 1 is provided as an example. Other examples may differ from what is described with regard to FIG. 1.

Figure 2:
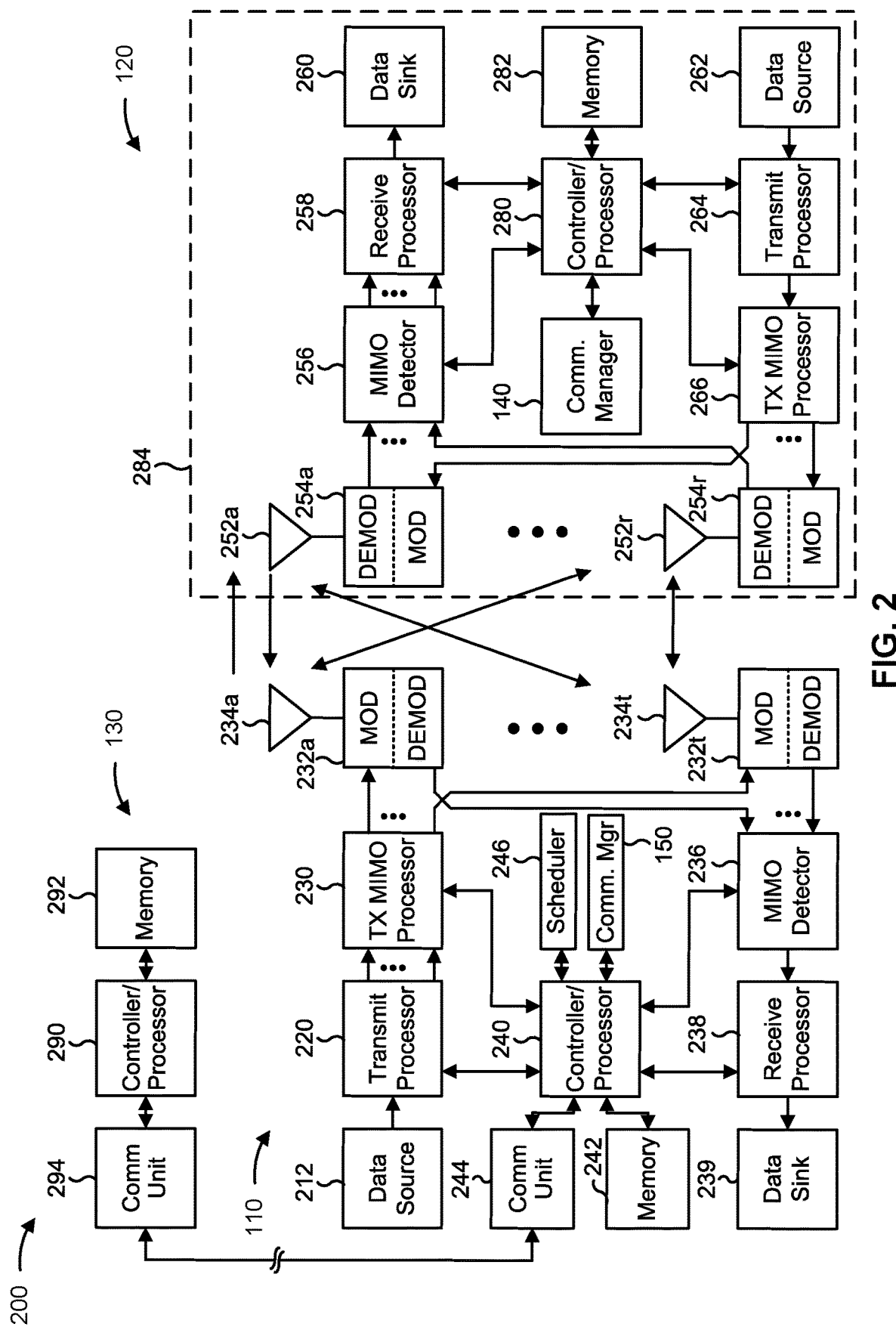
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-10).

The controller/processor 240 of the base station 110, the controller/processor 280 of the UE 120, and/or any other component(s) of FIG. 2 may perform one or more techniques associated with amplitude control capability signaling, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE includes means for transmitting, to a wireless device, information indicating an amplitude control capability of the UE; and/or means for receiving, from the wireless device, a communication using amplitude control. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the wireless device includes means for receiving, from a UE, information indicating an amplitude control capability of the UE; and/or means for transmitting, to the UE, a communication using one or more transmit parameters that are based at least in part on the UE being capable of performing amplitude control. In some aspects, the means for the wireless device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the wireless device to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
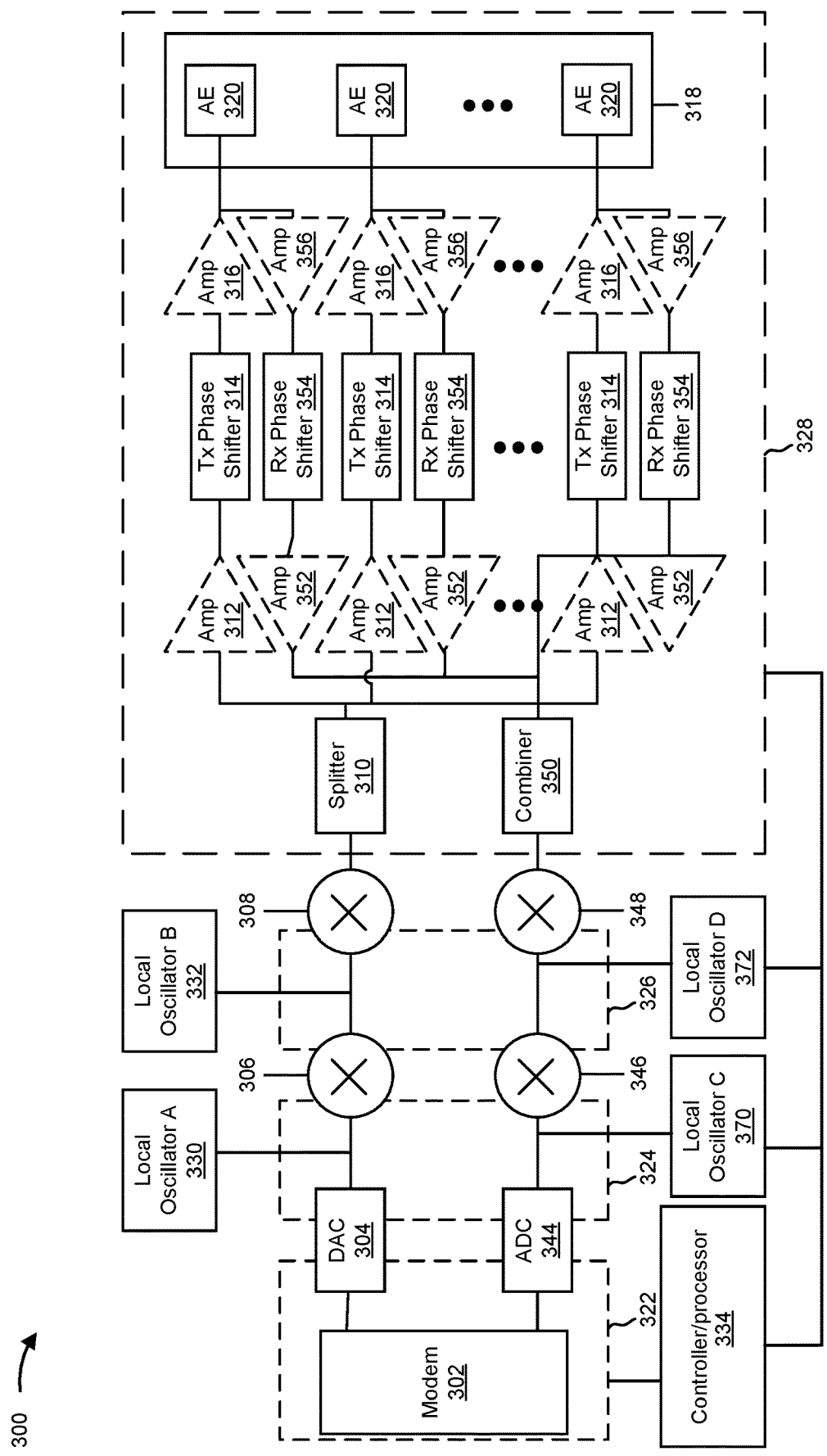
FIG. 3 is a diagram illustrating an example beamforming architecture that supports beamforming for millimeter wave (mmW) communications, in accordance with the present disclosure.

FIG. 3 is a diagram illustrating an example beamforming architecture 300 that supports beamforming for millimeter wave (mmW) communications, in accordance with the present disclosure. In some aspects, architecture 300 may implement aspects of wireless network 100. In some aspects, architecture 300 may be implemented in a transmitting device (e.g., a first wireless communication device, UE, or base station) and/or a receiving device (e.g., a second wireless communication device, UE, or base station), as described herein.

Broadly, FIG. 3 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320. In some examples, the modem 302 may be one or more of the modems 232 or modems 254 described in connection with FIG. 2.

Transmission lines or other waveguides, wires, and/or traces are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a controller/processor 334. In some aspects, controller/processor 334 corresponds to controller/processor 240 of the base station described above in connection with FIG. 2 and/or controller/processor 280 of the UE described above in connection with FIG. 2.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two-dimensional pattern, or another pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306, 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 and/or the controller/processor 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312, 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312, 316 are illustrated with dashed lines because one or both of them might not be necessary in some aspects. In some aspects, both the first amplifier 312 and second amplifier 316 are present. In some aspects, neither the first amplifier 312 nor the second amplifier 316 is present. In some aspects, one of the two amplifiers 312, 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312, 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312, 316 may be controlled independently (e.g., by the modem 302 or the controller/processor 334) to provide independent control of the gain for each antenna element 320 (i.e., amplitude control). For example, the modem 302 and/or the controller/processor 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be independently set to provide a desired amount of phase shift or the same amount of phase shift or some other configuration. The modem 302 and/or the controller/processor 334 may have at least one control line connected to each of the phase shifters 314 and which may be used to configure the phase shifters 314 to provide a desired amount of phase shift or phase offset between antenna elements 320.

In the illustrated architecture 300, RF signals received by the antenna elements 320 are provided to one or more first amplifiers 356 to boost the signal strength. The first amplifiers 356 may be connected to the same antenna arrays 318 (e.g., for time division duplex (TDD) operations). The first amplifiers 356 may be connected to different antenna arrays 318. The boosted RF signal is input into one or more phase shifters 354 to provide a configurable phase shift or phase offset for the corresponding received RF signal to enable reception via one or more Rx beams. The phase shifter 354 may be an active phase shifter or a passive phase shifter. The settings of the phase shifters 354 are independent, meaning that each can be independently set to provide a desired amount of phase shift or the same amount of phase shift or some other configuration. The modem 302 and/or the controller/processor 334 may have at least one control line connected to each of the phase shifters 354 and which may be used to configure the phase shifters 354 to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352, 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (e.g., not connected to a power source), which may result in some insertion loss. The combiner 350 may be an active combiner (e.g., connected to a power source), which may result in some signal gain. When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to analog signals. The analog signals output from ADC 344 is input to modem 302 for baseband processing, such as decoding, de-interleaving, or similar operations.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 322, 324, 326, 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 310, amplifiers 312, 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first and/or or second amplifiers 312, 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (e.g., for each antenna element chain) within the second mixer 308, and the local oscillator B 332 may supply different local oscillator signals (with different phase offsets) to each IF to RF mixer.

The modem 302 and/or the controller/processor 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312, 316 of the multiple signals relative to each other. The controller/processor 334 may be located partially or fully within one or more other components of the architecture 300. For example, the controller/processor 334 may be located within the modem 302 in some aspects.

As indicated above, FIG. 3 is provided as an example. Other examples may differ from what is described with regard to FIG. 3.

Figure 4:
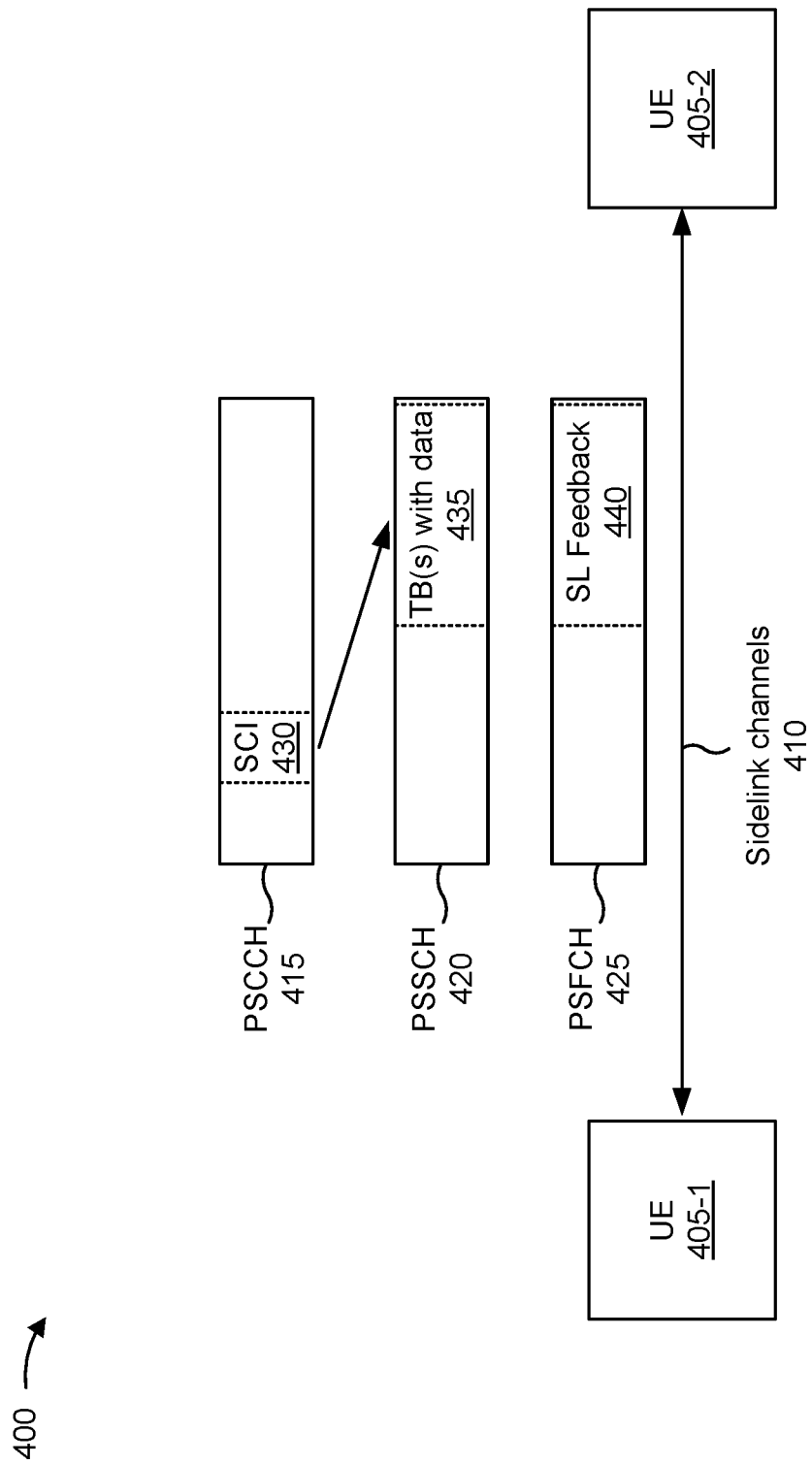
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, and/or V2P communications) and/or mesh networking. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, or symbols) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a base station 110 via an access link or an access channel. The PSSCH 420 may be used to communicate data, similar to a physical downlink shared channel (PDSCH) and/or a physical uplink shared channel (PUSCH) used for cellular communications with a base station 110 via an access link or an access channel. For example, the PSCCH 415 may carry sidelink control information (SCI) 430, which may indicate various control information used for sidelink communications, such as one or more resources (e.g., time resources, frequency resources, and/or spatial resources) where a transport block (TB) 435 may be carried on the PSSCH 420. The TB 435 may include data. The PSFCH 425 may be used to communicate sidelink feedback 440, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 415, in some aspects, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (e.g., time resources, frequency resources, and/or spatial resources) on the PSSCH 420, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 420, such as a hybrid automatic repeat request (HARQ) process ID, a new data indicator (NDI), a source identifier, a destination identifier, and/or a channel state information (CSI) report trigger.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a sidelink transmission mode (e.g., Mode 1) where resource selection and/or scheduling is performed by a base station 110. For example, the UE 405 may receive a grant (e.g., in downlink control information (DCI) or in a radio resource control (RRC) message, such as for configured grants) from the base station 110 for sidelink channel access and/or scheduling. In some aspects, a UE 405 may operate using a transmission mode (e.g., Mode 2) where resource selection and/or scheduling is performed by the UE 405 (e.g., rather than a base station 110). In some aspects, the UE 405 may perform resource selection and/or scheduling by sensing channel availability for transmissions. For example, the UE 405 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources and/or channel parameters. Additionally, or alternatively, the UE 405 may perform resource selection and/or scheduling by determining a channel busy rate (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, and/or a modulation and coding scheme (MCS) to be used for the upcoming sidelink transmission. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

As indicated above, FIG. 4 is provided as an example. Other examples may differ from what is described with respect to FIG. 4.

Figure 5:
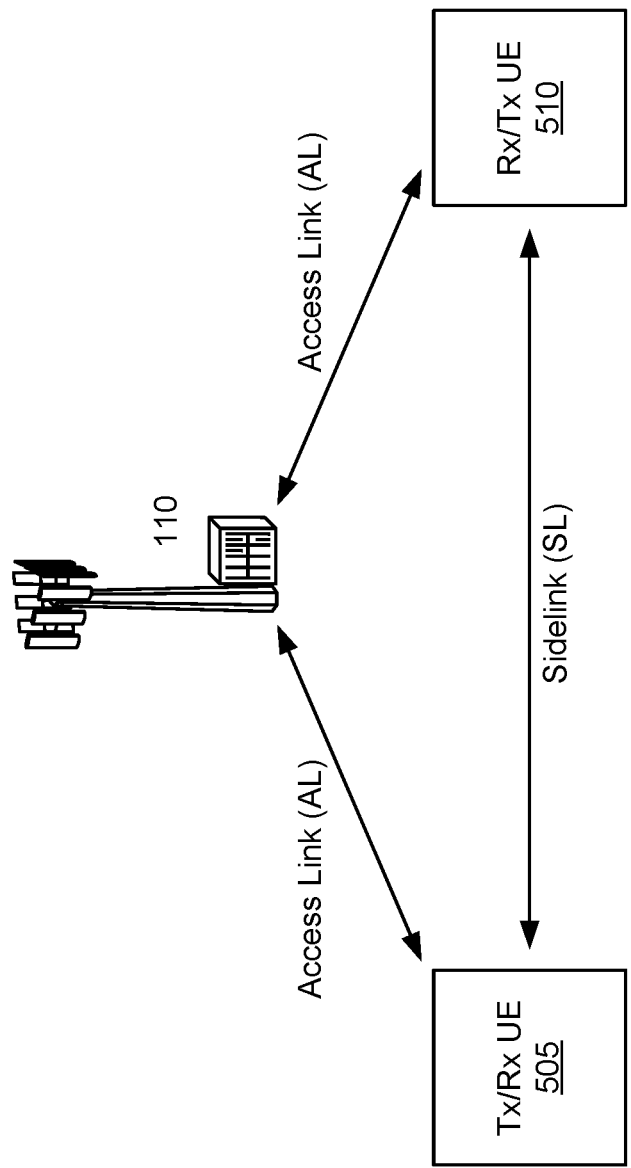
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a base station 110 may communicate with the Tx/Rx UE 505 via a first access link. Additionally, or alternatively, in some sidelink modes, the base station 110 may communicate with the Rx/Tx UE 510 via a second access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 5 is provided as an example. Other examples may differ from what is described with respect to FIG. 5.

While UEs may be capable of using amplitude control to adjust transmission power and beamforming gain, without a method for coordinating the use of amplitude control, signals transmitted and/or received by UEs using amplitude control may see little or no benefits, and even a reduction in signal quality. For example, when a transmitter uses amplitude control to transmit a communication, this would result in a reduction of effective isotropic radiated power (EIRP), which may reduce a signal to noise ratio (SNR) for the recipient of the communication.

Some techniques and apparatuses described herein enable wireless devices (e.g., UEs and base stations) to signal amplitude control capabilities to one another, which enables the wireless devices to communicate with one another using communication parameters that are based on the use of amplitude control. For example, a first UE may transmit information indicating amplitude control capabilities to a second UE, and the second UE may use the information to adjust one or more transmit parameters for sidelink communications transmitted to the first UE. For example, the second UE may increase or decrease an MCS such that an MCS index and/or modulation order is increased or decreased, leading to, respectively, higher or lower spectral efficiency (e.g., information rate). The first UE may use amplitude control when receiving the sidelink communication, resulting in a higher SNR, which enables the higher MCS to be more likely to be decoded successfully by the first UE. As a result, signal quality (e.g., SNR) and throughput (e.g., enabled by the higher MCS) of communications between one or more devices using amplitude control may increase, leading to more efficient communications, less network congestion, and/or the like. In addition, a transmitting device may be able to reduce transmission power using amplitude control for communication, the effects of which (e.g., reduced EIRP and SNR) may be counteracted by the receiving device using amplitude control to receive the communication with an improved SNR. When applied across multiple antennas and/or antenna arrays, which may be associated with different conditions (e.g., hand blockage or other signal blockage/distortion), the coordinated use of amplitude control may also counteract the effects of various conditions that might affect some antennas and/or antenna arrays but not others. This may also result in more reliable communications between wireless devices.

Figure 6:
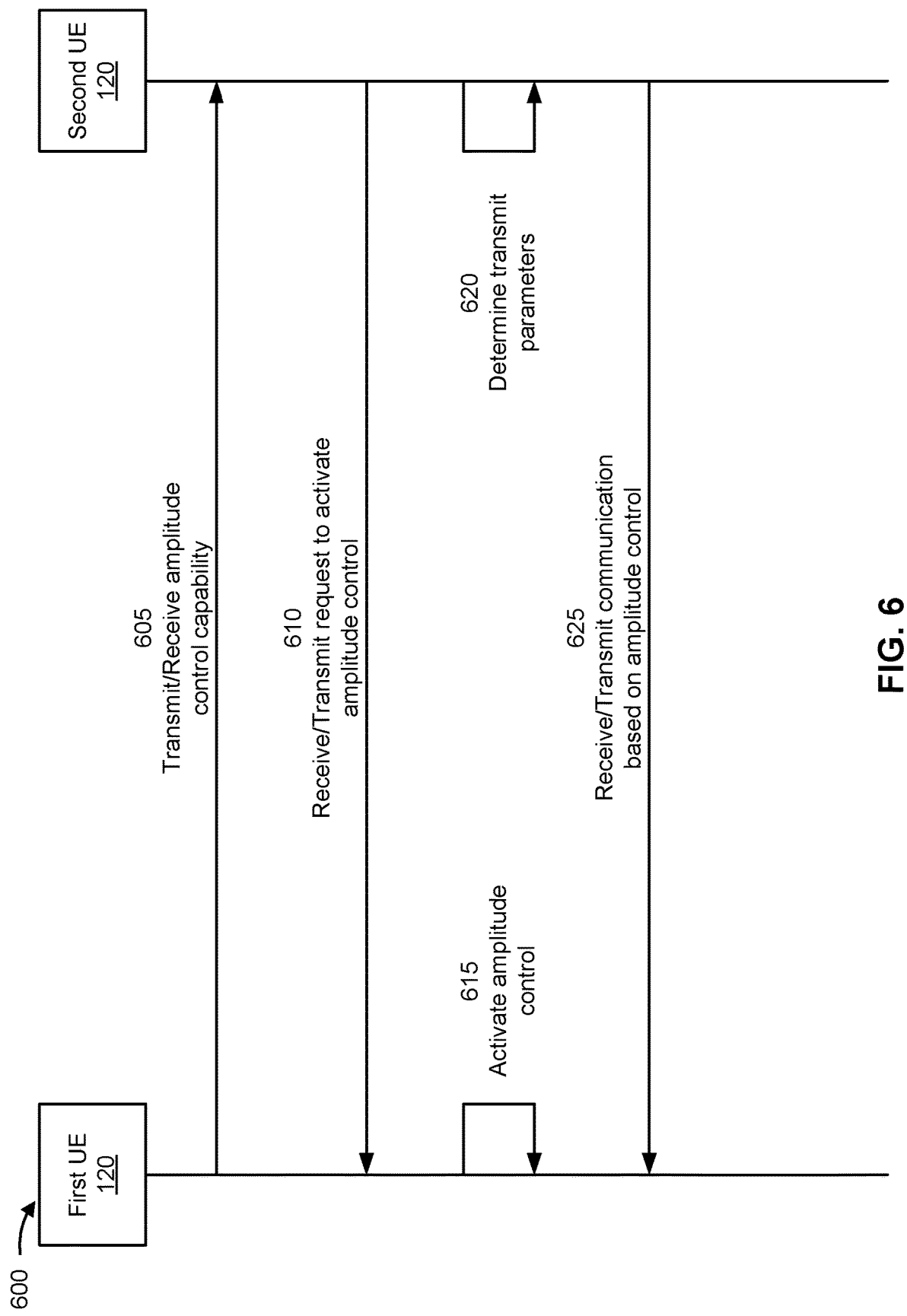
FIG. 6 is a diagram illustrating an example associated with amplitude control capability signaling, in accordance with the present disclosure.

FIG. 6 is a diagram illustrating an example 600 associated with amplitude control capability signaling, in accordance with the present disclosure. As shown in FIG. 6, a first UE (e.g., UE 120) and a second UE (e.g., UE 120) may communicate with one another. In some aspects, the first UE and the second UE may communicate with one another via sidelink communications, as described herein (e.g., via PSCCH, PSFCH, and/or PSSCH).

As shown by reference number 605, the first UE may transmit, and the second UE may receive, information indicating an amplitude control capability of the first UE. For example, the first UE may provide the second UE with information indicating the amplitude control capability of the first UE to enable the second UE to determine parameters for sidelink communications with the first UE. In some aspects, the information indicating the amplitude control capability may be represented by one or more bits in a field of a communication from the first UE to the second UE (e.g., an n-bit field of a PSCCH, PSFCH, or PSSCH, where n is a positive integer).

In some aspects, the information indicating the amplitude control capability includes a binary indicator that indicates whether the UE is capable of using amplitude control. For example, the binary indicator may include one or more bits (e.g., a single bit, with a value of 0 or 1) that indicate whether the first UE is capable of amplitude control. In some aspects, the information indicating the amplitude control capability includes a range of amplitude control or quantization steps of amplitude quantization. For example, the range of amplitude control may be represented by a minimum/low and/or maximum/high value of amplitude control (e.g., a dB value or values, represented as an absolute value or proportional value). The quantization steps of amplitude quantization may be represented by a low and/or high value of amplitude control, a number of steps between the low and high value, and/or a size of each step (e.g., a dB value or values, represented as an absolute value or proportional value). In some aspects, quantization steps may be uniform (e.g., each quantization step is associated with the same dB value, absolute or proportional), and in some aspects, quantization steps may be non-uniform (e.g., different quantization steps may be associated with different dB values, absolute or proportional).

In some aspects, the information indicating the amplitude control capability may include information indicating a period of time associated with the amplitude control. For example, the period of time may indicate how long the first UE is capable of keeping amplitude control active, how long the first UE keeps amplitude control active in response to a request to activate amplitude control, and/or, if currently active, how long amplitude control will remain active. The amount of time may be pre-configured or dynamically configured based on a request to activate amplitude control. In some aspects, the information indicating the amplitude control capability may indicate a current state of the amplitude control. For example, the current state of amplitude control at the first UE may be binary (e.g., active or not), active at a certain value or quantization step, or inactive, among other example states that may represent the current state of amplitude control at the first UE.

As described herein, amplitude control may be used for one or more antennas and/or antenna arrays. For example, amplitude control may be used to increase and/or decrease transmission power and/or beamforming antenna/array gain on particular antennas and/or antenna arrays, but not others. In a situation where the first UE is capable of amplitude control across multiple antennas and/or antenna arrays, information indicating this capability may also be included in the information indicating amplitude control capability. In some aspects, this capability may be assumed by the second UE. In some aspects, the information indicating amplitude control capability may indicate amplitude control capability for separate antennas and/or antenna arrays. For example, in a situation where the first UE is using one antenna array to communicate with the second UE, the information indicating the amplifier control capability may correspond to the one antenna array being used to communicate with the second UE.

As shown by reference number 610, in some aspects, the second UE may transmit, and the first UE may receive, a request for the first UE to activate amplitude control. For example, the second UE may transmit the request to cause the first UE to activate amplitude control. In some aspects, the request may indicate a particular amplitude control value. For example, the second UE may request that the first UE use a particular amplitude control value (e.g., within a range of amplitude control values and/or at a particular quantization step).

In some aspects, the second UE may determine the particular amplitude control value based at least in part on the information indicating the amplitude control capability. For example, the second UE may use a formula to determine, given a change in one or more transmit parameters for a sidelink communication from the second UE, an amplitude control value (e.g., including binary active or inactive amplitude control value) or set of amplitude control values (e.g., including a binary active/inactive amplitude control value, an amplitude control value indicating a period of time associated with amplitude control, and/or the like) that account for the change in the one or more transmit parameters. For example, the second UE may determine that an increase (or decrease) in MCS and/or an amplitude control value used by the second UE for transmission of the sidelink communication may enable the first UE to use amplitude control at a particular amplitude value and/or for a particular period of time.

In some aspects, the request may indicate at least one of the transmit parameters to be used for sidelink communications transmitted to the first UE by the second UE. For example, the one or more parameters may include an MCS for the communication, an amplitude control value for the communication (e.g., an amplitude control value applied by the second UE for transmission of the communication, including an actual amplitude value, a), a set of amplitude control values for the communication, and/or a timing for amplitude control activation and/or duration, among other examples.

In some aspects, the second UE may transmit the request based at least in part on the second UE reaching a maximum transmit power (or some other power limit). For example, the second UE may have reached a threshold and elected to not, or be unable to, transmit at a maximum and/or expected transmit power. In this situation, the second UE may activate amplitude control for transmission of sidelink communications with the first UE. As using amplitude control for transmission would reduce the EIRP of the transmission, which may reduce the SNR of the sidelink communication when received by the first UE, the second UE may transmit the request to enable the first UE to use amplitude control to counteract the reduction in EIRP and SNR.

Various situations may cause the second UE to determine the one or more transmit parameters differently based at least in part on the amplitude control capability of the first UE, such as a situation where the second UE determines a conflict between EIRP and gain associated with the first UE. For example, when amplitude control is used by the second UE, EIRP is reduced, which may result in a reduction of SNR at the first UE. As a result, the second UE may reduce MCS to compensate for the reduction in the SNR, and/or the first UE may use amplitude control to increase the SNR. When amplitude control is used by the first UE, the SNR may improve. As a result, the second UE may increase MCS to take advantage of the improved SNR, and/or the second UE may use amplitude control to reduce the second UE's transmit power. Accordingly, the one or more transmit parameters may be selected by the second UE based at least in part on the use of amplitude control by the first UE and/or second UE. In some aspects, the second UE may determine to increase MCS for communications with the first UE, in which case the second UE may transmit the request based at least in part on the determination to increase MCS. In some aspects, additional communications between the first UE and the second UE may be used to negotiate the one or more parameters for transmission, including the use of amplitude control by the first UE and/or the second UE.

As shown by reference number 615, in some aspects, the first UE may activate amplitude control based at least in part on the request. For example, the first UE may activate amplitude control at a default configured value of amplitude control (e.g., binary on/off if only capable of binary amplitude control, a value of amplitude control in a range of values, or a quantization step of amplitude control, as described herein). In a situation where the request indicates a particular amplitude control value requested, the first UE may activate amplitude control at the requested value. In a situation where the request indicates one or more transmit parameters, the first UE may activate amplitude control at a value based at least in part on the one or more transmit parameters. For example, as described herein, the first UE may use a formula to determine, based at least in part on the one or more transmit parameters, a value of amplitude control that would account for a change in the one or more transmit parameters (e.g., activate amplitude control based on the request indicating an increased MCS to be used for sidelink communications). As another example, in a situation where the request includes a timing value indicating a timing for activation of amplitude control, the first UE may activate amplitude control based at least in part on the timing value. In some aspects, as described herein, the activation of amplitude control may be applied across multiple antennas and/or antenna arrays, and the amplitude control may be different for different antennas and/or antenna arrays. For example, activation of amplitude control may cause an increase in antenna gain for one antenna and a decrease in antenna gain for another antenna.

As shown by reference number 620, the second UE may determine one or more transmit parameters based at least in part on the information indicating the amplitude control capability of the first UE. In some aspects, the second UE may determine the one or more transmit parameters prior to transmitting the request (e.g., as described herein with respect to reference number 610). As described herein, the one or more transmit parameters determined by the second UE may include an MCS, an amplitude control value (e.g., an amplitude control value applied by the second UE for transmission), and/or a timing for amplitude control activation and/or duration, among other examples.

As shown by reference number 625, the second UE may transmit, and the first UE may receive, a communication based at least in part on the amplitude control capability of the first UE. For example, the first UE may receive the communication using amplitude control, and the second UE may transmit the communication using one or more transmit parameters that are based at least in part on the UE being capable of performing amplitude control. In some aspects, the first UE may activate amplitude control based at least in part on receipt of the communication. The activation of the amplitude control may be based at least in part on the one or more transmit parameters of the communication (e.g., dynamically activating and/or adjusting amplitude control based on the one or more transmit parameters) or, as described herein, based at least in part on a prior request from the second UE.

In some aspects, various actions depicted in example 600 may be repeated periodically and/or based on a change in channel conditions. For example, in a situation where an antenna array of one UE experiences a blockage or other signal degradation, the process may be repeated for the use of amplitude control on a different antenna array. In addition, while example 600 is described as a situation where the first UE is a receiver and the second UE is a transmitter, in some aspects, the first UE and the second UE may both be transmitters and/or receivers using amplitude control. For example, each step shown as being performed by the first UE could also be performed by the second UE, and each step shown as being performed by the second UE could also be performed by the first UE (e.g., enabling both the first and the second UE to use amplitude control for both transmission and reception). Furthermore, while example 600 depicts communications between two UEs, either UE could be replaced by a base station. In other words, a base station could perform the actions described as being performed by the first UE or the second UE when communicating with another UE.

As indicated above, FIG. 6 is provided as an example. Other examples may differ from what is described with respect to FIG. 6.

Figure 7:
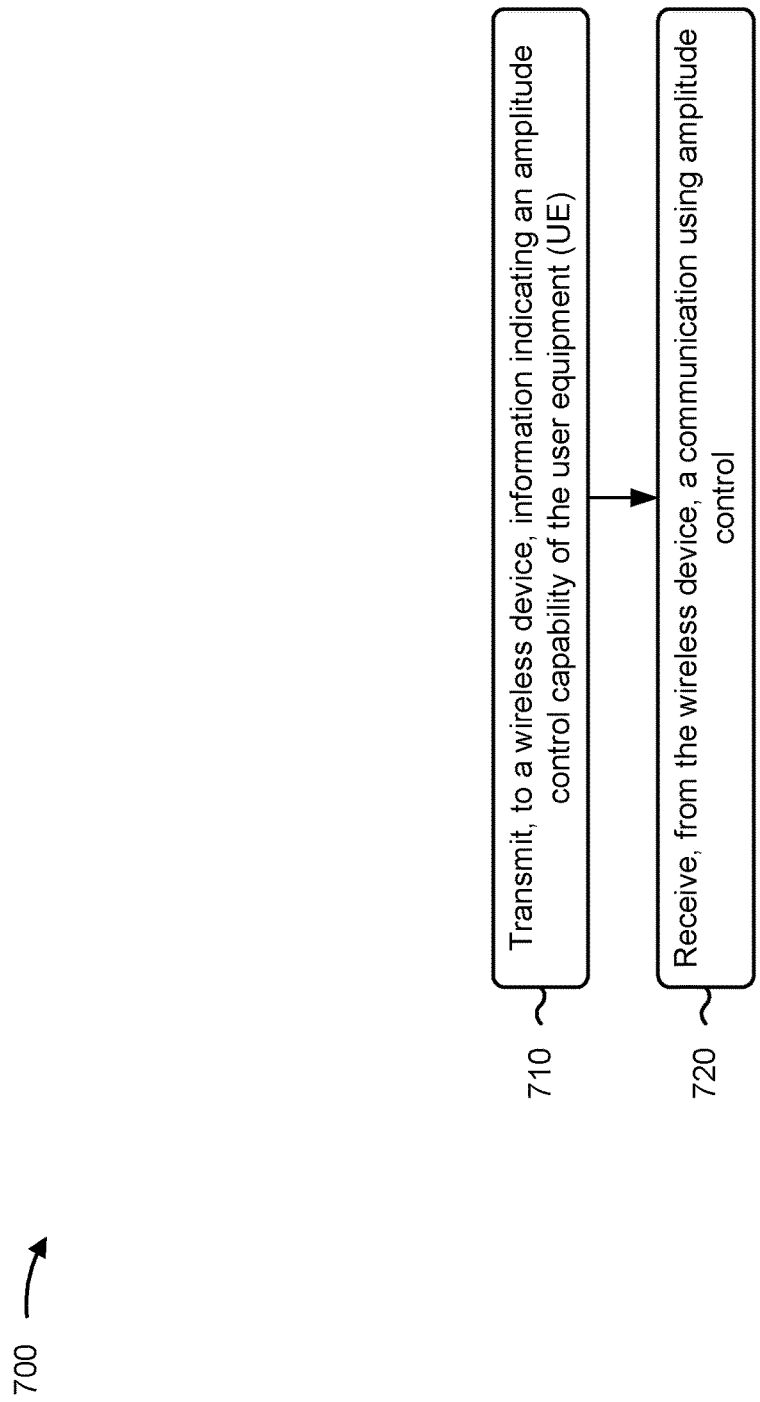
FIGS. 7 and 8 are diagrams illustrating example processes associated with amplitude control capability signaling, in accordance with the present disclosure.

FIG. 7 is a diagram illustrating an example process 700 performed, for example, by a UE, in accordance with the present disclosure. Example process 700 is an example where the UE (e.g., UE 120) performs operations associated with amplitude control capability signaling.

As shown in FIG. 7, in some aspects, process 700 may include transmitting, to a wireless device, information indicating an amplitude control capability of the UE (block 710). For example, the UE (e.g., using communication manager 140 and/or transmission component 904, depicted in FIG. 9) may transmit, to a wireless device, information indicating an amplitude control capability of the UE, the information indicating the amplitude control capability indicating a period of time associated with the amplitude control, as described above.

As further shown in FIG. 7, in some aspects, process 700 may include receiving, from the wireless device, a communication using amplitude control (block 720). For example, the UE (e.g., using communication manager 140 and/or reception component 902, depicted in FIG. 9) may receive, from the wireless device, a communication using amplitude control, as described above.

Process 700 may include additional aspects, such as any single aspect or any combination of aspects described below and/or in connection with one or more other processes described elsewhere herein.

In a first aspect, the information indicating the amplitude control capability comprises at least one of a range of amplitude control, or steps of amplitude quantization.

In a second aspect, alone or in combination with the first aspect, the information indicating the amplitude control capability is a binary indicator that indicates whether the UE is capable of using amplitude control.

In a third aspect, alone or in combination with one or more of the first and second aspects, the information indicating the amplitude control capability comprises information indicating a period of time associated with the amplitude control.

In a fourth aspect, alone or in combination with one or more of the first through third aspects, the wireless device is a base station.

In a fifth aspect, alone or in combination with one or more of the first through fourth aspects, the wireless device is another UE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
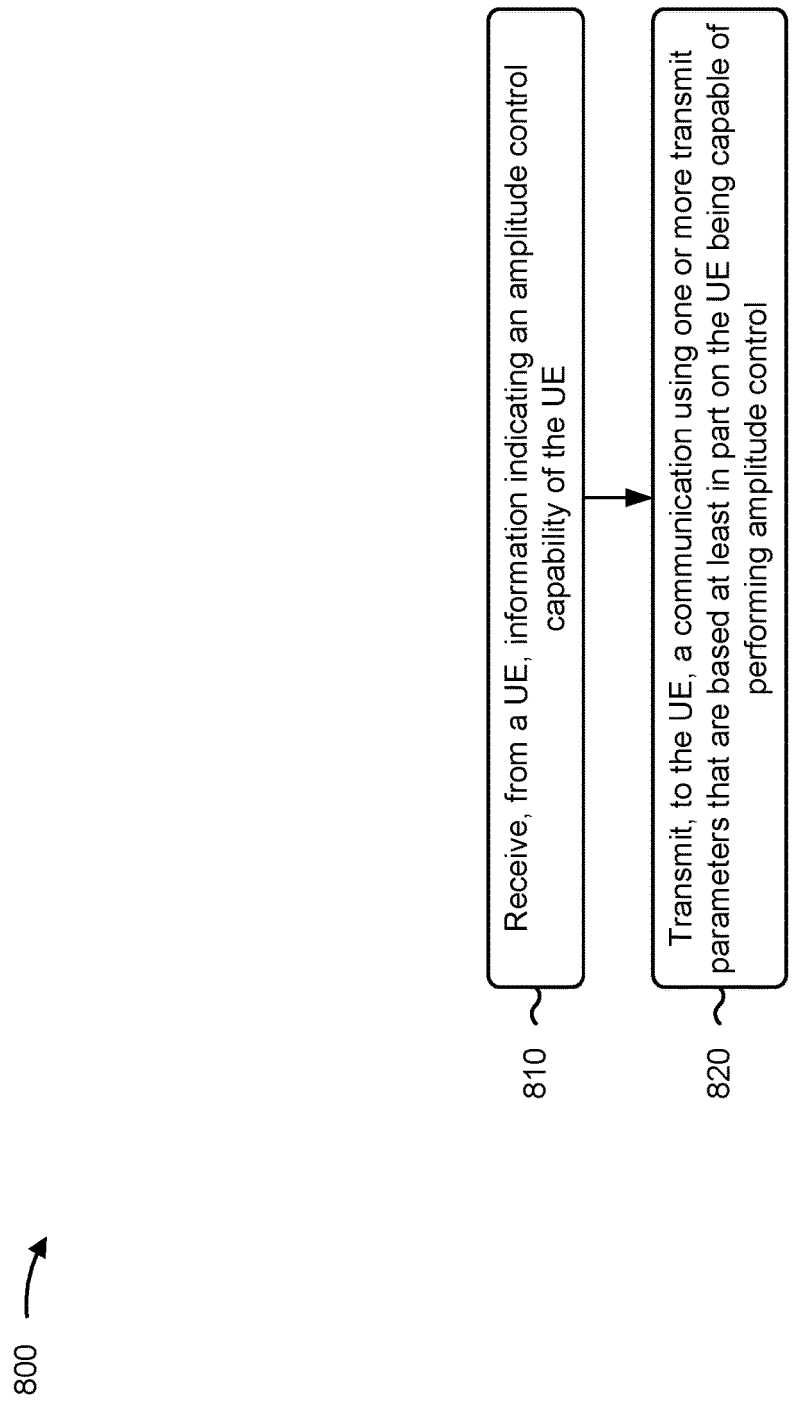

FIG. 8 is a diagram illustrating an example process 800 performed, for example, by a wireless device, in accordance with the present disclosure. Example process 800 is an example where the wireless device (e.g., base station 110 or UE 120) performs operations associated with amplitude control capability signaling.

As shown in FIG. 8, in some aspects, process 800 may include receiving, from a UE, information indicating an amplitude control capability of the UE (block 810). For example, the wireless device (e.g., using communication manager 140 or 150, and/or reception component 902 or 1002, depicted in FIGS. 9 and 10) may receive, from a UE, information indicating an amplitude control capability of the UE, the information indicating the amplitude control capability indicating a period of time associated with the amplitude control, as described above.

As further shown in FIG. 8, in some aspects, process 800 may include transmitting, to the UE, a communication using one or more transmit parameters that are based at least in part on the UE being capable of performing amplitude control (block 820). For example, the wireless device (e.g., using communication manager 140 or 150 and/or transmission component 904 or 1004, depicted in FIGS. 9 and 10) may transmit, to the UE, a communication using one or more transmit parameters that are based at least in part on the UE being capable of performing amplitude control, as described above.

Process 800 may include additional aspects, such as any single aspect or any combination of aspects described below and/or in connection with one or more other processes described elsewhere herein.

In a first aspect, process 800 includes transmitting, to the UE, a request for the UE to activate amplitude control.

In a second aspect, alone or in combination with the first aspect, the request indicates a particular amplitude control value.

In a third aspect, alone or in combination with one or more of the first and second aspects, the request indicates at least one of the one or more transmit parameters.

In a fourth aspect, alone or in combination with one or more of the first through third aspects, transmitting the request comprises transmitting the request based at least in part on the wireless device reaching a maximum transmit power.

In a fifth aspect, alone or in combination with one or more of the first through fourth aspects, process 800 includes determining the one or more transmit parameters based at least in part on the information indicating the amplitude control capability of the UE.

In a sixth aspect, alone or in combination with one or more of the first through fifth aspects, determining the one or more transmit parameters comprises determining at least one of an MCS for the communication, or an amplitude control value for the communication.

In a seventh aspect, alone or in combination with one or more of the first through sixth aspects, the information indicating the amplitude control capability comprises at least one of a range of amplitude control, or steps of amplitude quantization.

In an eighth aspect, alone or in combination with one or more of the first through seventh aspects, the information indicating the amplitude control capability is a binary indicator that indicates whether the UE is capable of using amplitude control.

In a ninth aspect, alone or in combination with one or more of the first through eighth aspects, the information indicating the amplitude control capability comprises information indicating a period of time associated with the amplitude control.

In a tenth aspect, alone or in combination with one or more of the first through ninth aspects, the one or more transmit parameters include at least one of an amplitude control value of the communication, or an MCS of the communication.

In an eleventh aspect, alone or in combination with one or more of the first through tenth aspects, the wireless device is a base station.

In a twelfth aspect, alone or in combination with one or more of the first through eleventh aspects, the wireless device is another UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Some techniques and apparatuses described herein enable wireless devices (e.g., UEs and base stations) to signal amplitude control capabilities to one another, which enables the wireless devices to communicate with one another using communication parameters that are based on the use of amplitude control. For example, a first UE may transmit information indicating amplitude control capabilities to a second UE, and the second UE may use the information to adjust one or more transmit parameters (e.g., increasing an MCS) for sidelink communications transmitted to the first UE. The first UE may use amplitude control when receiving the sidelink communication, resulting in a higher SNR, which enables the higher MCS to be more likely to be decoded successfully by the first UE. As a result, signal quality (e.g., SNR) and throughput (e.g., enabled by higher MCS) of communications between one or more devices using amplitude control may increase, leading to more efficient communications, less network congestion, and/or the like. In addition, a transmitting device may be able to reduce transmission power using amplitude control for communication, the effects of which (e.g., reduced EIRP and SNR) may be counteracted by the receiving device using amplitude control to receive the communication with an improved SNR. When applied across multiple antennas and/or antenna arrays, which may be associated with different conditions (e.g., hand blockage or other signal blockage/distortion), the coordinated use of amplitude control may also counteract the effects of various conditions that might affect some antennas and/or antenna arrays but not others. This may also result in more reliable communications between wireless devices.

Figure 9:
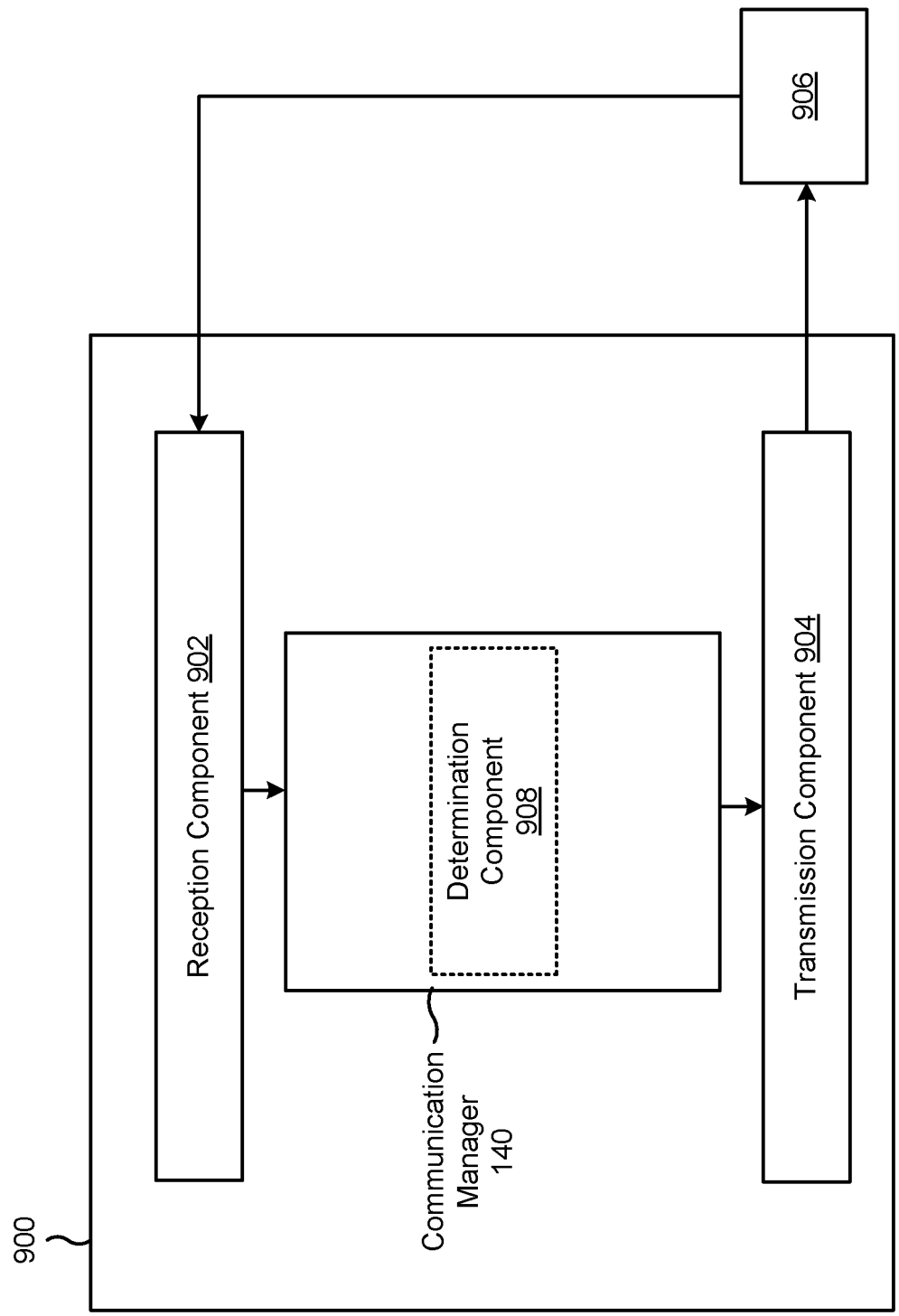
FIGS. 9 and 10 are diagrams of example apparatuses for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a determination component 908, among other examples.

In some aspects, the apparatus 900 may be configured to perform one or more operations described herein in connection with FIGS. 3-6. Additionally, or alternatively, the apparatus 900 may be configured to perform one or more processes described herein, such as process 700 of FIG. 7, process 800 of FIG. 8, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The transmission component 904 may transmit, to a wireless device, information indicating an amplitude control capability of the UE, the information indicating the amplitude control capability indicating a period of time associated with the amplitude control. The reception component 902 may receive, from the wireless device, a communication using amplitude control.

The reception component 902 may receive, from a UE, information indicating an amplitude control capability of the UE, the information indicating the amplitude control capability indicating a period of time associated with the amplitude control. The transmission component 904 may transmit, to the UE, a communication using one or more transmit parameters that are based at least in part on the UE being capable of performing amplitude control.

The transmission component 904 may transmit, to the UE, a request for the UE to activate amplitude control.

The determination component 908 may determine the one or more transmit parameters based at least in part on the information indicating the amplitude control capability of the UE.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
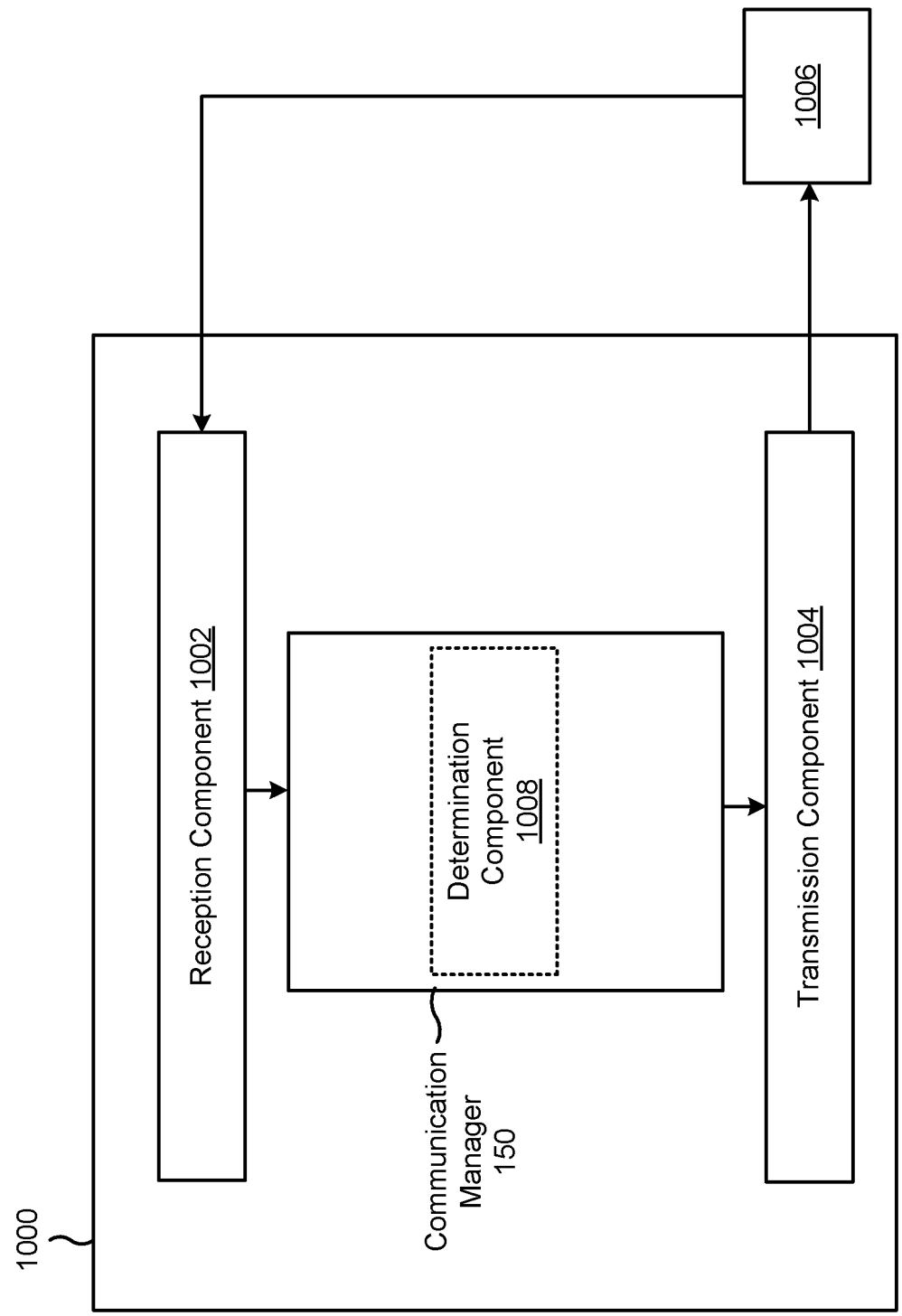

FIG. 10 is a diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a determination component 1008, among other examples.

In some aspects, the apparatus 1000 may be configured to perform one or more operations described herein in connection with FIGS. 3-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The reception component 1002 may receive, from a UE, information indicating an amplitude control capability of the UE, the information indicating the amplitude control capability indicating a period of time associated with the amplitude control. The transmission component 1004 may transmit, to the UE, a communication using one or more transmit parameters that are based at least in part on the UE being capable of performing amplitude control.

The transmission component 1004 may transmit, to the UE, a request for the UE to activate amplitude control.

The determination component 1008 may determine the one or more transmit parameters based at least in part on the information indicating the amplitude control capability of the UE.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a UE, comprising: transmitting, to a wireless device, information indicating an amplitude control capability of the UE, the information indicating the amplitude control capability indicating a period of time associated with the amplitude control; and receiving, from the wireless device, a communication using amplitude control.

Aspect 2: The method of Aspect 1, wherein the information indicating the amplitude control capability comprises at least one of: a range of amplitude control, or quantization steps of amplitude quantization.

Aspect 3: The method of any of Aspects 1-2, wherein the information indicating the amplitude control capability is a binary indicator that indicates whether the UE is capable of using amplitude control.

Aspect 4: The method of any of Aspects 1-3, wherein the information indicating the period of time comprises: information indicating a pre-configured duration of time, during which the amplitude control is active.

Aspect 5: The method of any of Aspects 1-4, wherein the wireless device is a base station.

Aspect 6: The method of any of Aspects 1-4, wherein the wireless device is another UE.

Aspect 7: A method of wireless communication performed by a wireless device, comprising: receiving, from a UE, information indicating an amplitude control capability of the UE, the information indicating the amplitude control capability indicating a period of time associated with the amplitude control; and transmitting, to the UE, a communication using one or more transmit parameters that are based at least in part on the UE being capable of performing amplitude control.

Aspect 8: The method of Aspect 7, further comprising: transmitting, to the UE, a request for the UE to activate amplitude control.

Aspect 9: The method of Aspect 8, wherein the request indicates a particular amplitude control value or a particular set of amplitude control values.

Aspect 10: The method of any of Aspects 8-9, wherein the request indicates at least one of the one or more transmit parameters.

Aspect 11: The method of any of Aspects 8-10, wherein transmitting the request comprises: transmitting the request based at least in part on at least one of: the wireless device reaching a maximum transmit power, the wireless device determining to increase an MCS for the communication, or the wireless device determining a conflict between EIRP and gain associated with the UE.

Aspect 12: The method of any of Aspects 7-11, further comprising: determining the one or more transmit parameters based at least in part on the information indicating the amplitude control capability of the UE.

Aspect 13: The method of Aspect 12, wherein determining the one or more transmit parameters comprises: determining at least one of: an MCS for the communication, an amplitude control value for the communication, or a set of amplitude control values for the communication.

Aspect 14: The method of any of Aspects 7-13, wherein the information indicating the amplitude control capability comprises at least one of: a range of amplitude control, or quantization steps of amplitude quantization.

Aspect 15: The method of any of Aspects 7-14, wherein the information indicating the amplitude control capability is a binary indicator that indicates whether the UE is capable of using amplitude control.

Aspect 16: The method of any of Aspects 7-15, wherein the information indicating the period of time comprises: information indicating a pre-configured duration of time, during which the amplitude control is active.

Aspect 17: The method of any of Aspects 7-16, wherein the one or more transmit parameters include at least one of: an amplitude control value of the communication, a set of amplitude control values of the communication, or an MCS of the communication.

Aspect 18: The method of any of Aspects 7-17, wherein the wireless device is a base station.

Aspect 19: The method of any of Aspects 7-17, wherein the wireless device is another UE.

Aspect 20: An apparatus for wireless communication at a device, comprising a processor; memory coupled with the processor; and instructions stored in the memory and executable by the processor to cause the apparatus to perform the method of one or more of Aspects 1-19.

Aspect 20: An apparatus for wireless communication at a device, comprising a processor; memory coupled with the processor; and instructions stored in the memory and executable by the processor to cause the apparatus to perform the method of one or more of Aspects 1-19.

Aspect 21: A device for wireless communication, comprising a memory and one or more processors coupled to the memory, the one or more processors configured to perform the method of one or more of Aspects 1-6.

Aspect 21: A device for wireless communication, comprising a memory and one or more processors coupled to the memory, the one or more processors configured to perform the method of one or more of Aspects 7-19.

Aspect 22: An apparatus for wireless communication, comprising at least one means for performing the method of one or more of Aspects 1-6.

Aspect 22: An apparatus for wireless communication, comprising at least one means for performing the method of one or more of Aspects 7-19.

Aspect 23: A non-transitory computer-readable medium storing code for wireless communication, the code comprising instructions executable by a processor to perform the method of one or more of Aspects 1-6.

Aspect 23: A non-transitory computer-readable medium storing code for wireless communication, the code comprising instructions executable by a processor to perform the method of one or more of Aspects 7-19.

Aspect 24: A non-transitory computer-readable medium storing a set of instructions for wireless communication, the set of instructions comprising one or more instructions that, when executed by one or more processors of a device, cause the device to perform the method of one or more of Aspects 1-6.

Aspect 24: A non-transitory computer-readable medium storing a set of instructions for wireless communication, the set of instructions comprising one or more instructions that, when executed by one or more processors of a device, cause the device to perform the method of one or more of Aspects 7-19.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      transmit, to another UE, information indicating an amplitude control capability of the UE for sidelink communication with the other UE, the information indicating the amplitude control capability indicating a period of time associated with the amplitude control; and
      receive, from the other UE, the sidelink communication using amplitude control.

2. The UE of claim 1, wherein the information indicating the amplitude control capability comprises at least one of:
   a range of amplitude control, or
   quantization steps of amplitude quantization.

3. The UE of claim 1, wherein the information indicating the amplitude control capability is a binary indicator that indicates whether the UE is capable of using amplitude control.

4. The UE of claim 1, wherein the information indicating the period of time comprises:
information indicating a pre-configured duration of time, during which the amplitude control is active.

5. A user equipment (UE) for wireless communication, comprising:
a memory; and
one or more processors, coupled to the memory, configured to:
receive, from another UE, information indicating an amplitude control capability of the other UE for sidelink communication with the other UE, the information indicating the amplitude control capability indicating a period of time associated with the amplitude control; and
transmit, to the other UE, the sidelink communication using one or more transmit parameters that are based at least in part on the other UE being capable of performing amplitude control.

6. The UE of claim 5, wherein the one or more processors are further configured to:
transmit, to the other UE, a request for the other UE to activate amplitude control.

7. The UE of claim 6, wherein the request indicates a particular amplitude control value or a particular set of amplitude control values.

8. The UE of claim 6, wherein the request indicates at least one of the one or more transmit parameters.

9. The UE of claim 6, wherein the one or more processors, to transmit the request, are configured to:
transmit the request based at least in part on at least one of:
the UE reaching a maximum transmit power,
the UE determining to increase a modulation and coding scheme (MCS) for the sidelink communication, or
the UE determining a conflict between effective isotropic radiated power (EIRP) and gain associated with the UE.

10. The UE of claim 5, wherein the one or more processors are further configured to:
determine the one or more transmit parameters based at least in part on the information indicating the amplitude control capability of the other UE.

11. The UE of claim 10, wherein the one or more processors, to determine the one or more transmit parameters, are configured to:
determine at least one of:
a modulation and coding scheme (MCS) for the sidelink communication,
an amplitude control value for the sidelink communication, or
a set of amplitude control values for the sidelink communication.

12. The UE of claim 5, wherein the information indicating the amplitude control capability comprises at least one of:
a range of amplitude control, or
quantization steps of amplitude quantization.

13. The UE of claim 5, wherein the information indicating the amplitude control capability is a binary indicator that indicates whether the other UE is capable of using amplitude control.

14. The UE of claim 5, wherein the information indicating the period of time comprises:
information indicating a pre-configured duration of time, during which the amplitude control is active.

15. The UE of claim 5, wherein the one or more transmit parameters include at least one of:
an amplitude control value of the sidelink communication,
a set of amplitude control values of the sidelink communication, or
a modulation and coding scheme (MCS) of the sidelink communication.

16. A method of wireless communication performed by a user equipment (UE), comprising:
transmitting, to another UE, information indicating an amplitude control capability of the UE for sidelink communication with the other UE, the information indicating the amplitude control capability indicating a period of time associated with the amplitude control; and
receiving, from the other UE, the sidelink communication using amplitude control.

17. The method of claim 16, wherein the information indicating the amplitude control capability comprises at least one of:
a range of amplitude control, or
quantization steps of amplitude quantization.

18. The method of claim 16, wherein the information indicating the amplitude control capability is a binary indicator that indicates whether the UE is capable of using amplitude control.

19. The method of claim 16, wherein the information indicating the period of time comprises:
information indicating a pre-configured duration of time, during which the amplitude control is active.

20. A method of wireless communication performed by a user equipment (UE), comprising:
receiving, from another UE, information indicating an amplitude control capability of the UE for sidelink communication with the other UE, the information indicating the amplitude control capability indicating a period of time associated with the amplitude control; and
transmitting, to the other UE, the sidelink communication using one or more transmit parameters that are based at least in part on the UE being capable of performing amplitude control.

21. The method of claim 20, further comprising:
transmitting, to the other UE, a request for the other UE to activate amplitude control.

22. The method of claim 21, wherein transmitting the request comprises:
transmitting the request, based at, least, in part on at least one of:
the UE reaching a maximum transmit power,
the UE determining to increase a modulation and coding scheme (MCS) for the sidelink communication, or
the UE determining a conflict between effective isotropic radiated power (EIRP) and gain associated with the UE.

23. The method of claim 20, further comprising:
determining the one or more transmit parameters based at least in part on the information indicating the amplitude control capability of the other UE.

24. The method of claim 23, wherein determining the one or more transmit parameters comprises:

determining at least one of:
- a modulation and coding scheme (MCS) for the sidelink communication,
- an amplitude control value for the sidelink communication, or
- a set of amplitude control values for the sidelink communication.

25. The method of claim 20, wherein the information indicating the amplitude control capability comprises at least one of:
- a range of amplitude control, or
- quantization steps of amplitude quantization.

26. The method of claim 20, wherein the information indicating the amplitude control capability is a binary indicator that indicates whether the other UE is capable of using amplitude control.

27. The method of claim 20, wherein the information indicating the period of time comprises:
- information indicating a pre-configured duration of time, during which the amplitude control is active.

28. The method of claim 20, wherein the one or more transmit parameters include at least one of:
- an amplitude control value of the sidelink communication, or
- a modulation and coding scheme (MCS) of the sidelink communication.

\* \* \* \* \*